United States Patent [19]

Igarashi

[11] Patent Number: 5,304,701
[45] Date of Patent: Apr. 19, 1994

[54] MELTING FURNACE FOR TREATING WASTES AND A HEATING METHOD OF THE SAME

[75] Inventor: Hiroshi Igarashi, Katsuta, Japan

[73] Assignee: Doryokuro Kakunenryo Kaihatsu Jigyodan, Tokyo, Japan

[21] Appl. No.: 416,525

[22] Filed: Oct. 3, 1989

[30] Foreign Application Priority Data

Oct. 21, 1988 [JP] Japan ................. 63-265530

[51] Int. Cl.$^5$ ............................... C03B 5/027
[52] U.S. Cl. .......................... 588/201; 588/900; 373/30; 373/34; 373/35
[58] Field of Search ............ 252/636, 629; 373/27, 373/29, 30, 34, 35; 568/900, 201

[56] References Cited

U.S. PATENT DOCUMENTS

| | | | |
|---|---|---|---|
| 1,438,936 | 12/1922 | Eimer | 373/29 |
| 2,781,411 | 2/1957 | Geffcken et al. | 373/30 |
| 4,143,232 | 3/1979 | Bansal et al. | 13/6 |
| 4,366,571 | 12/1982 | Palmquist | 373/30 |
| 4,399,544 | 8/1983 | Monaghan | 373/35 |
| 4,611,331 | 9/1986 | Palmquist et al. | 373/30 |
| 4,627,069 | 12/1986 | Harvey et al. | 373/29 |
| 4,782,497 | 11/1988 | Sasaki et al. | 373/29 |
| 4,895,678 | 1/1990 | Ohtsuka et al. | 252/632 |
| 5,062,118 | 10/1991 | Masiki | 373/41 |
| 5,131,005 | 7/1992 | Takajo et al. | 373/27 |

OTHER PUBLICATIONS

"Melters and Furnace Equipment Used for Radioactive Waste Conditioning", Claude Sombret, pp. 259-263, Proceedings of the 1987 International Waste Management Conference, Nov. 29-Dec. 5, 1987.

Primary Examiner—Donald P. Walsh
Assistant Examiner—Daniel Jenkins
Attorney, Agent, or Firm—Wenderoth, Lind & Ponack

[57] ABSTRACT

A melting furnace for treating wastes is provided which has a container equipped with a feed port for a glass raw material and wastes to be treated at the top thereof and a discharge port for molten glass containing said wastes at the bottom thereof, the container having a wall made of a heat resistant alloy and the container wall being in contact with molten glass inside the container; a heating electrode disposed in the container, the container wall acting as a counter electrode for the heating electrode; and a cooling system disposed at the back side of the container wall. By directly supplying electric power to the glass means disposed at the back side of the container wall.

By directly supplying electric power to the glass between the container wall and the heating electrode, the molten glass containing the wastes can be formed. By conducting cooling of the container wall by the cooling system, corrosion of the wall due to the atmosphere in the container can be restricted.

6 Claims, 2 Drawing Sheets

MELTING FURNACE FOR TREATING WASTES AND A HEATING METHOD OF THE SAME

BACKGROUND OF THE INVENTION

The present invention relates to a melting furnace for treating industrial wastes, particularly high-level radioactive wastes, and a heating method of the melting furnace.

In order to treat industrial wastes, particularly high-level radioactive wastes, there has been utilized heretofore a method wherein the wastes are put into a molten glass and resulting mixture is cooled to form a vitrified product immobilizing the wastes therein.

The conventional glass melting furnaces for this purpose can be classified broadly into a metallic melting furnace and a refractory melting furnace according to the kind of wall materials that are in contact with molten glass.

For the metallic melting furnace, there have been generally employed an external heating method wherein the glass inside the furnace is heated from the outside of the furnace by intermediate frequency induction heating or by resistance heating, and a microwave heating method wherein the glass inside the furnace is heated directly by applying microwaves. On the other hand, for the refractory melting furnace, an electric power supply heating method wherein the glass inside the furnace is heated by supplying electric power through electrodes has been employed.

However, the conventional metallic melting furnaces generally involve the problems that the metallic wall materials in contact with molten glass are corroded and, since this corrosion is promoted by heating, the service life of the furnace is shortened. In contrast, the refractory melting furnace can have its service life extended by selecting wall materials having high corrosion resistance such as chromia-alumina type refractory bricks or the like, but is not free from the drawback that the secondary wastes such as the wall materials after the end of the service life are generated in large quantities. It has been reported that 80 g of secondary wastes per 1 Kg of glass were generated in a melting furnace of this kind (C. G. Sombret, "Melters and Furnace Equipment Used for Radioactive Waste Conditioning" in Proceedings of the 1987 International Waste Management Conference, Hong Kong, Nov. 29–Dec. 5, 1987, p259).

In accordance with the external heating method employed for the metallic melting furnace, on the other hand, the necessary energy is supplied to the glass inside the furnace by heat transfer through the wall surface that is in contact with the glass to be melted. Therefore, it is difficult to increase the contact surface area in proportion to the increase of the processing capacity after a certain processing capacity has been achieved and, thus, there is an inevitable limit to the processing capacity per unit volume of the furnace. For example, it has been reported in the above-described reference that the maximum processing capacity per unit vitrification plant for treating high level radioactive wastes in France was 35 kg glass/hr. In order to treat the radioactive wastes on an industrial scale, therefore, a plurality of melting furnaces must be installed and if they are installed, there occurs another problem that the operation becomes complicated.

The microwave heating method involves the problem that if the melting furnace is large in scale, only the surface portion of the glass charged into the furnace is heated but the inner portions thereof cannot be melted sufficiently. Therefore, this method is not suitable, either, for the industrial treating method of the radioactive wastes.

There is also a problem in the power supply heating method which has been employed for the refractory melting furnace. Namely, in the processing of high-level radioactive wastes generated during the reprocessing of spent nuclear fuels of a nuclear power plant, for example, a radioactive waste containing therein platinum group metals is produced. When such a radioactive waste is heated by the power supply heating in the refractory melting furnace, electrically conductive materials which are difficult to be dissolved in the molten glass are produced and deposited at the bottom of the furnace. Since the current flows concentratedly through the conductive materials deposited at the furnace bottom, the current efficiency drops and the processing performance of the furnace is caused to deteriorate.

SUMMARY OF THE INVENTION

An object of the present invention is to provide a melting furnace for treating wastes which can solve the prior art problems described above, and which has high corrosion resistance and long service life.

Another object of the present invention is to provide a melting furnace for treating wastes which generates a smaller quantity of secondary wastes.

A further object of the present invention is to provide a heating method for the above-described melting furnace wherein high heating efficiency is achieved and large quantities of wastes can be treated.

According to the present invention, the above-described objects are accomplished by a melting furnace for treating wastes comprising a container equipped with a feed port for a glass raw material and wastes to be treated at the top thereof and a discharge port for molten glass containing the wastes at the bottom thereof, a heating electrode disposed in the container, and cooling means disposed at the back side of a wall of the container. The container wall is made of a heat resistant alloy. It is in contact with molten glass inside the container, and acts as a counter electrode of the heating electrode.

In the present invention, there is also provided a heating method for the above-described melting furnace comprising supplying electric power to the glass between the heating electrode and the container wall to heat and melt the glass while cooling the container wall by operating the cooling means.

In the preferred embodiment of the present invention, heating means is disposed in the proximity of the discharge port for the molten glass so that the molten glass accumulated at the bottom of the container is heated by the heating means in such a manner as to be capable of flowing out of the discharge port when the molten glass containing the wastes is withdrawn from the discharge port. As the heating means, an induction heating coil or a resistance heating element may be employed. A bottom wall of the container is preferably provided with an inclination extending toward the discharge port for the molten glass.

An electrode made of a heat resistant alloy and equipped with a cooling means therein may be preferably employed as the heating electrode.

A flow path of a cooling fluid may be disposed at the back side of the container wall as the cooling means. In this case, the container wall is used as one of walls of the flow path. Cooling air, for example, may be supplied into the flow path from an inlet port of the flow path.

Further, an electromagnetic horn for irradiating microwaves toward the inside of the container may be disposed at the top of the container so as to heat the surface portion of the glass and the wastes inside the container by using the electromagnetic horn while performing the power supply heating by the electrodes.

According to the present invention, the molten glass containing the wastes can be formed by supplying the glass and the wastes into the container of the melting furnace from the feed port of the container and supplying power to the glass between the container wall and the heating electrode to heat and melt the glass.

At the time of this power supply heating, the container wall, i.e. the electrode, made of the heat resistant alloy which is in contact with the high temperature molten glass is cooled by the cooling means disposed on the back side of the container wall, and is maintained at a low temperature. If required, the heating electrode may be cooled by the cooling means provided therein.

When the flow path of cooling fluid is used as the cooling means and cooling air is supplied from the inflow port of the flow path, the cooling air takes heat from the surfaces of the container wall and the heating electrode thereby cooling the surfaces thereof. Simultaneously with this, the temperature of the cooling air is elevated, and when the air is discharged from the outflow port of the flow path, it is heated to a high temperature sufficient for promoting the melting of the glass raw material by controlling the inflow conditions of the air, such as the temperature and flow rate.

When the heating means is disposed in the proximity of the discharge port of the molten glass, flowability of the molten glass to be discharged can be increased by heating the molten glass accumulated at the bottom of the container by the heating means. Therefore, electrically conductive materials, which are produced by treating high-level radioactive waste, can smoothly be discharged together with the molten glass from the discharge port.

PREFERRED EMBODIMENTS OF THE INVENTION

Hereinafter, the present invention will be explained more definitely with reference to the drawings showing an embodiment of the invention.

Figure 1:
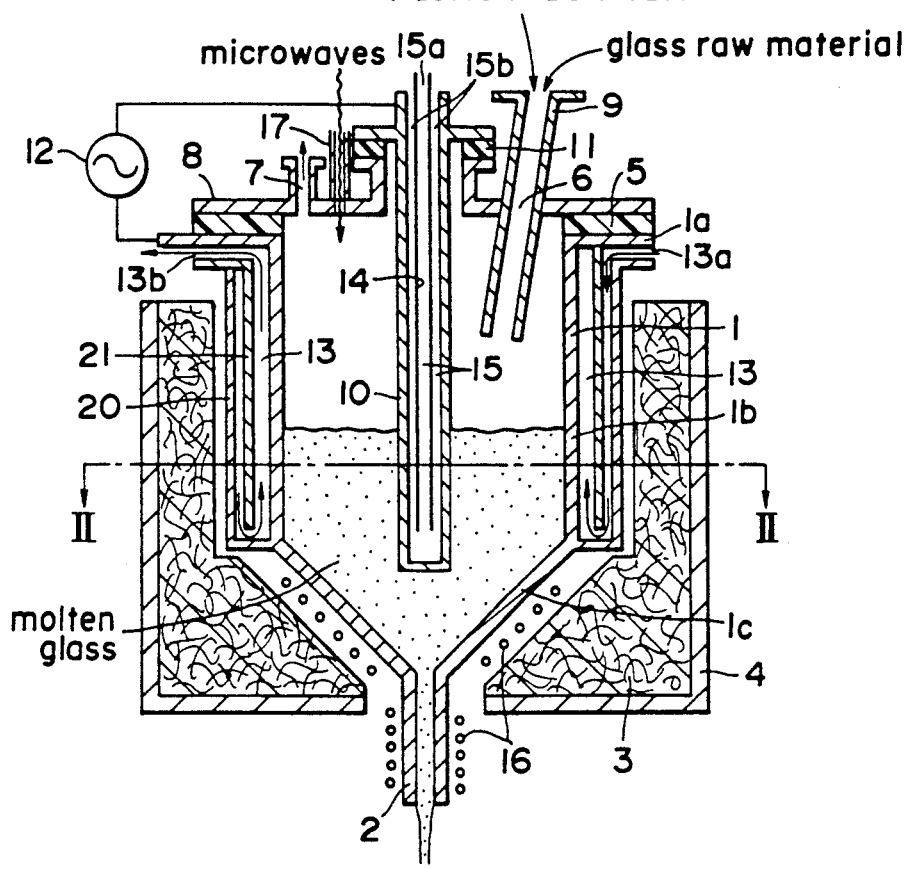
FIG. 1 is a vertical sectional view showing an example of a melting furnace for treating wastes in accordance with the present invention.
Figure 2:
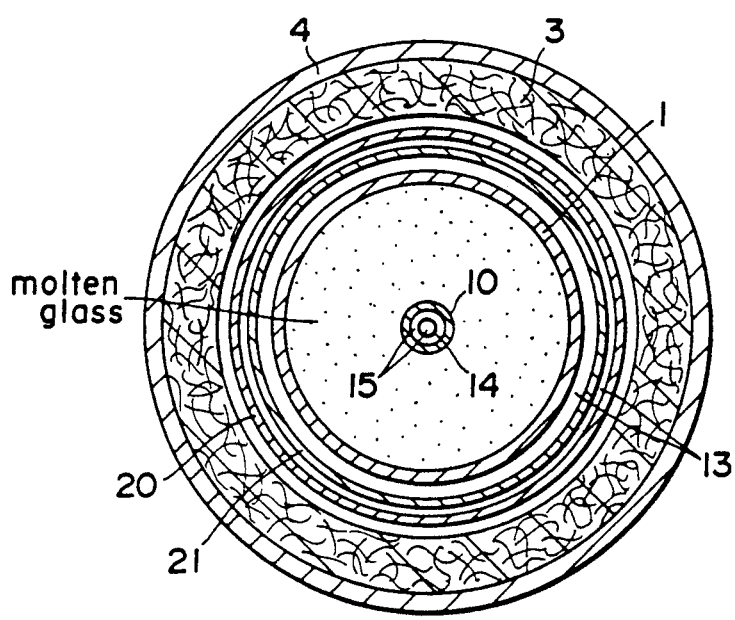
FIG. 2 is a horizontal sectional view taken along line 2—2 of FIG. 1.

FIGS. 1 and 2 show an example of the melting furnace for treating the wastes according to the present invention. The melting furnace includes a container 1 made of a heat resistant alloy which comprises a cylindrical portion 1b for melting the glass and a tapered portion 1c for discharging the molten glass. The upper edge 1a of the glass melting portion 1b projects outwardly. The molten glass discharge portion 1c is tapered from the lower end of the glass melting portion 1b at an angle of inclination of from 30° to 60° and is provided at the tip thereof a molten glass discharge nozzle 2 of a freeze valve type. The container 1 is supported vertically and fixedly by a refractory 3 disposed therearound and by a metallic casing 4 containing the refractory 3.

On the upper edge 1a of the container 1, an upper cover 8 is disposed via an insulating material 5. The upper cover 8 has a feed port 6 for supplying the glass raw material and the wastes to be treated into the container 1 and a gas exhaust port 7 for exhausting gas generated inside the container 1. A supply nozzle 9 is fitted in the feed port 6 in such a manner as to extend through it. A circular opening is bored substantially at the center of the upper cover 8, and a cylindrical heating electrode 10 made of a heat resistant alloy and having a closed bottom end is vertically inserted through the circular opening via an insulating material 11 in such a manner that the lower end of the electrode 10 is dipped into the space occupied by the molten glass inside the container 1. The electrode 10 is connected electrically to the container 1 through an A.C. power source 12.

A flow path 13 for a cooling fluid is disposed at the back side or on the outside of the glass melting portion 1b of the container 1. The flow path 13 is defined by a cylindrical enclosure 20 which is formed between the glass melting portion 1b and the refractory 3 and has a lower end integrally projecting from the container 1 at the boundary of the portion 1b and the portion 1c, and by a baffle plate 21 which is suspended from the upper edge 1a of the container 1 and partitions the space defined within the enclosure 20 into inner and outer spaces. A communication port is disposed in the flow path 13 between the inner and outer spaces and an inflow port 13a and an outflow port 13b for causing the inflow of the cooling fluid into the outer space and the outflow of the cooling fluid from the inner space are disposed near the upper edge 1a of the container 1, respectively. A hollow pipe 14 is inserted into the inside of the electrode 10 to leave a gap between the outer wall of the hollow pipe 14 and the inner wall of the electrode 10 and to leave a gap between the lower end of the hollow pipe 14 and the bottom for the electrode 10. Thus, a flow path 15 of a cooling fluid is defined by the inside of the hollow pipe 14 and the gap between the hollow pipe 14 and the electrode 10. An inflow port 15a is disposed at the top of the hollow pipe 14 and an outflow port 15b is disposed at the top of the gap between the pipe 14 and the electrode 10.

A heating unit 16 consisting of an induction heating coil or a resistance heating element is disposed between the molten glass discharge portion 1c of the container 1 and the refractory 3 and around the molten glass discharge nozzle 2. The heating unit 16 is connected electrically to an external power source not shown in the drawings.

The thus constituted melting furnace for treating the wastes operates as described hereinbelow. The glass raw material and the wastes to be treated are first charged into the container 1 between the glass melting portion 1b and the electrode 10 through the supply nozzle 9.

Next, when a voltage from the A.C. power source 12 is applied between the electrode 10 and the container 1 while the cooling air is supplied through the inflow port 13a of the flow path 13 and through the inflow port 15a of the flow path 15, an electric current flows through the glass between the inner wall of the container 1 and the electrode 10 to heat and melt the glass by Joule heat while the surfaces of the glass melting portion 1b of the container 1 and the electrode 10 are forcibly cooled by the cooling air flowing through the flow paths 13 and 15. The wastes are taken into the thus formed molten glass to produce the molten glass containing the wastes therein. The cooling air flowing through the flow paths 13 and 15 takes heat from the glass melting portion 1b of the container 1 and the electrode 10 and when it is discharged from the respective outflow ports 13b and 15b, the air has attained a high temperature.

The gas generated inside the container 1 during the melting process of the glass raw material and the wastes is discharged from the exhaust gas port 7.

To withdraw the molten glass containing the wastes produced during the process described above, the heating unit 16 is heated by the external heating power source not shown in the drawings. Then, the molten glass discharge portion 1c of the container 1 and the molten glass discharge nozzle 2 are heated by the heating unit 16 so that the glass containing the wastes within the container is sufficiently melted and can be discharged through the molten glass nozzle 2 with high flowability. The molten glass containing the wastes discharged from the nozzle 2 is poured into a can called a canister and preserved or stored in the cooled and solidified state.

The treatment of the wastes described above employs the heating method in which the glass in the container 1 is melted while cooling the surfaces of the glass melting portion 1b of the container 1 and the electrode 10. Accordingly, their surface temperatures become lower than when cooling is not effected and corrosion of the surfaces due to the atmosphere in the container 1 can be restricted. In other words, since the distance between the electrode 10 and the counter electrode consisting of the glass melting portion 1b is relatively short, the current density between them and their surface temperatures become high, and normally corrosion of their surfaces in contact with the molten glass progresses vigorously. However, by cooling the surfaces of these electrodes according to the present invention, corrosion of the surfaces can be restricted drastically, and thus the melting furnace can have a longer service life than when cooling is not provided. It will of course be understood that the surfaces of the furnace wall and the electrode are not to a temperature below a temperature at which the glass within the furnace will remain molten.

Since the heat resistant alloy is used for the container 1 and for the electrode 10, the thus constructed melting furnace generates a smaller quantity of secondary wastes in comparison with the melting furnace using a container made of a refractory material.

Furthermore, the power supply heating is carried out through all the portions of the glass between the inner wall of the container 1 and the electrode 10 and the electrode 10 is disposed into the molten glass. Therefore, the processing capacity per unit volume of the melting furnace can be improved by selecting suitably the shapes and sizes of the container 1 and the electrode 10, the distance between the electrodes and the power of the A.C. power source 12.

Even when the high level radioactive wastes containing platinum group metals are treated, the resulting electrically conductive materials which are difficult to be dissolved are smoothly discharged from the container 1 together with the molten glass, because the inclination having an angles of 30° to 60° is provided at the molten glass discharge portion 1c of the container 1 and because the glass on the portion 1c and in the nozzle 2 is sufficiently heated by using the heating unit 16. Accordingly, the drop of current efficiency and hence, the drop of heating efficiency, due to the deposition of the conductive materials can be prevented. Even if the electrically conductive material is deposited on the bottom of the container 1 between the draining operations, electrical shortage through the conductive material hardly occurs because the container itself serves as an electrode.

Moreover, since the refractory 3 is disposed around the container 1, the molten glass is supported and maintained by the refractory 3 even if the container 1 is broken accidentally and the molten glass leaks from the container 1, and safety can thus be secured. The insulating materials 5 and 11 disposed between the upper edge 1a of the container 1 and the upper cover 8 and between the upper cover 8 and electrode 10 prevent mutual electric contact of the container 1, the upper cover 8 and the electrode 10 and thus electric short-circuit does not occur. The temperature of the air flowing through the flow path 13 near the glass level inside the container 1 can be elevated to a high temperature capable of promoting the melting of the glass raw materials by suitably controlling the inflow conditions of the cooling air flowing through the flow path 13 such as, for example, the temperature and the flow rate, and the radiant heat from this high temperature air can be utilized for melting the glass raw materials thereby further improving the processing capacity per unit of melting furnace.

In the melting furnace according to the present invention, the cooling fluid caused to flow through the paths 13 and 15 at the time of power supply heating is not limited to the cooling air, and other cooling fluids such as cooling water can of course be used.

Figure 3:
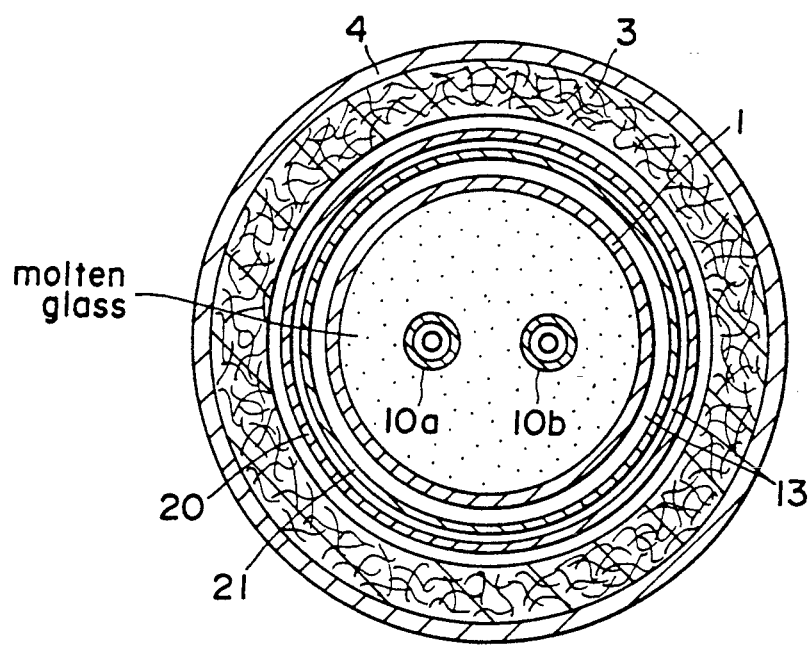
FIG. 3 is a horizontal sectional view similar to FIG. 2 wherein a plurality of heating electrodes are provided according to another example of a melting furnace of the present invention.

Furthermore, in the melting furnace according to the present invention, it is possible to provide a plurality of heating electrodes, as shown in FIG. 3, for improving the processing capacity per unit volume of the furnace or to dispose an electromagnetic horn 17 for irradiating microwaves on the upper cover 8 in order to apply microwaves to the glass surface inside the container 1 in addition to the power supply heating. It is also possible to perform the power supply heating and heating of the molten glass discharge portion 1c of the container 1 by the heating unit 16 simultaneously. Thus, various changes and modifications can be made without departing from the scope of the appended claims of the present invention.

As is apparent from the foregoing, according to the melting furnace of the present invention, the following advantageous effects can be obtained. Namely, since the heating electrode is positioned in the container having the wall made of heat resistance alloy which service as the counter electrode and the heating electrode is inserted into the glass to be melted, the power supply heating can be carried out directly through all the portions of glass between the electrode positioned in the container and the counter electrode constituted by the container wall. Thus, the processing capacity per unit volume of the melting furnace can be improved, and the container, and hence the melting furnace can be made compact in size.

In the melting furnace of the present invention, the cooling means is disposed at the back side of the container wall, and the heating method for such a melting furnace is employed in which the glass is melted by directly supplying power to the glass between the electrode and the counter electrode of the container wall while cooling of the container wall is conducted by the cooling means. Therefore, the container wall in contact with the molten glass is cooled and corrosion thereof due to the conditions in the container can be effectively restricted so that the service life of the container, and hence the life of the melting furnace, can be improved.

In addition, since the wall of the container is made of heat resistance alloy, only the container need be replaced when it reaches the end of its service life. As a result, the quantity of the secondary wastes generated is smaller in comparison with that generated by the refractory furnace.

Accordingly, in the present invention, it becomes possible to treat large quantities of wastes by one unit of melting furnace for a long time, and to reduce labor and expenses which are required for treating the secondary wastes such as the container after the completion of its service life.

Furthermore, the molten glass accumulated at the bottom of the container can be easily discharged from the glass discharge nozzle, since the heating unit is disposed around the glass discharge nozzle and in the proximity thereof and the bottom of the container has an inclination extending toward the discharge nozzle. Therefore, even when the high level radioactive waste containing platinum group metals are treated, the resulting conductive materials which are difficult to dissolve can be discharged smoothly outside the container together with the molten glass. As a result, the drop of current efficiency due to deposition of the conductive materials can be prevented and heating efficiency can be improved.

What is claimed is:

1. A melting furnace for treating wastes, comprising:
   a container having at the top thereof a feed port for a glass raw material and wastes to be treated, and at the bottom thereof a discharge port for molten glass containing the wastes, said container having a wall made of an electrically conductive heat resistant alloy and having an inner surface adapted to contact molten glass inside said container during operation of said surface, and said container further having a wall having a cylindrical side wall portion and a conical bottom wall portion with an inclination of 30° to 60° extending toward said discharge port, said container wall being made of an electrically conductive heat resistant alloy and having an inner surface adapted to contact molten glass inside said container during operation of said surface;
   at least one heating electrode positioned in said container spaced from said container wall, said container wall being a counter electrode for said heating electrode;
   forced air cooling means disposed at the outer surface of said side wall portion for forcibly air cooling said side wall portion to a temperature no lower than a temperature at which glass within said container will remain molten;
   a power source electrically connected between said container wall and said heating electrode for supplying electric power to glass between said heating electrode and said container wall; and
   heating means disposed around said discharge port for the molten glass and the outer surface of said conical bottom wall portion.

2. The melting furnace according to claim 1, wherein said heating means comprises an induction heating coil or a resistance heating element.

3. The melting furnace according to claim 1, wherein said heating electrode comprises an electrode made of a heat resistant alloy and having a cooling means therein.

4. The melting furnace according to claim 1, wherein said forced air cooling means comprises a flow path for a cooling air disposed on the outside of said side wall portion, said side wall portion being used as one of walls of said flow path.

5. The melting furnace according to claim 1, further comprising an electromagnetic horn for irradiating microwaves toward the inside of said container disposed at the top of the container.

6. The melting furnace according to claim 1, wherein a plurality of heating electrodes are disposed in the container.

* * * * *